May 8, 1951 S. KLEINHANS 2,552,181
EJECTING DEVICE

Filed May 24, 1946 2 Sheets-Sheet 1

INVENTOR.
SCHUYLER KLEINHANS
BY Edwin Coates
ATTORNEY

May 8, 1951      S. KLEINHANS      2,552,181
EJECTING DEVICE

Filed May 24, 1946      2 Sheets-Sheet 2

INVENTOR.
SCHUYLER KLEINHANS
BY Edwin Coates
ATTORNEY

Patented May 8, 1951

2,552,181

UNITED STATES PATENT OFFICE 2,552,181

EJECTING DEVICE

Schuyler Kleinhans, Santa Monica, Calif., assignor to Douglas Aircraft Company, Inc., Santa Monica, Calif.

Application May 24, 1946, Serial No. 671,947

6 Claims. (Cl. 244—122)

This invention relates to an ejecting device and more particularly to a device for ejecting a pilot or other occupant from an aircraft while immobilized therein by aircraft attitude or speed-generated forces.

Various means have been heretofore proposed for projecting occupants from aircraft but these previously proposed means have consisted of catapults energized by such means as explosive charges and springs. The motivating means for the catapults necessarily expended their force during a brief interval of time to gain the high acceleration necessary to propel the occupant from the aircraft. The high acceleration forces exerted on the occupant in many instances produced physiological changes detrimental to the occupant or threw him in the path of craft-borne obstructions.

The present invention provides, for automatically ejecting an occupant from an aircraft, an extremely simplified yet reliable apparatus which cannot itself damage the occupant or throw him against obstructions and will function substantially infallibly to securely transport him to a region where it will be safe for him to open his parachute. For, in the novel ejecting apparatus, the motivating means are such that the seat-starting force is built up gradually instead of acting instantaneously, and the motivating acceleration can selectively be predetermined. No large initial shock or impact is, therefore, applied to the occupant. Further, the device enables the ejection force to be applied for such a time and thru such a distance as is necessary to transport the seat at least outside the slipstream and beyond the craft-borne obstructions. There is no possibility, therefore, of the pilot being thrown or airblasted against any obstruction on the craft. Also, since the ejecting force is applicable over a relatively greatly extended distance, it need not be so large as in previous ejectors. Accordingly, no great strain is brought to bear upon the occupant at any time during the ejection.

In its presently preferred embodiment the apparatus essentially comprises a seat releasably mounted for movement outwardly of the craft; and seat-contained, low-impulse, motivating means operatively associated therewith for applying thereto an outwardly acting, gradual urge having a relatively small initial effect on an accumulative nature which is applied continuously to the seat over a relatively elongated application-distance outside the aircraft at a predetermined development rate. The force applied to the seat is maintained through a distance sufficient to bodily transport the seat out of the cockpit, and beyond the air blast, that is, the rearwardly directed airstream passing over the fuselage due to the forward motion of the aircraft and the maximum extent of any obstruction on the craft, that is, beyond the envelope defined by the obstructions or projections of the aircraft and out of any danger of being blown against any part of the aircraft. At this point, the occupant may safely unfasten his safety belt, actuate his parachute and descend, without any danger of being carried by the slipstream against craft-borne obstructions.

The preferred form of seat-motivating means comprises a seat-contained jet-reaction instrumentality and preferably consists of a non-ballistic, non-explosive propelling-type of rocket. The rocket is attached by its closed end to the underside of the seat in a downwardly directed attitude with its nozzle discharging outwardly of the aircraft through a normally closed but pilot-openable aperture in the belly skin of the craft. However, as hereinbefore made manifest, the invention is by no means limited to the use of a rocket per se for motivating the seat, as it contemplates self-motivation by any means having the characteristics aforestated. It hence includes within its scope the utilization for the purpose of a small, compact jet-engine, a miniature rocket-motor, or the like.

A single control instrumentality may, if desired, be provided for simultaneously releasing the seat, opening the rocket discharge aperture and igniting the rocket.

The presently-preferred constructions and arrangements embodying these concepts are illustrated, by way of example only, in the accompanying drawings and described hereinafter in conjunction therewith. It is to be understood, however, that the invention is by no means limited to this showing or description, the concepts being in fact embodiable in any constructional form lying within the scope of the subjoined claims.

In these drawings.

Figure 1:
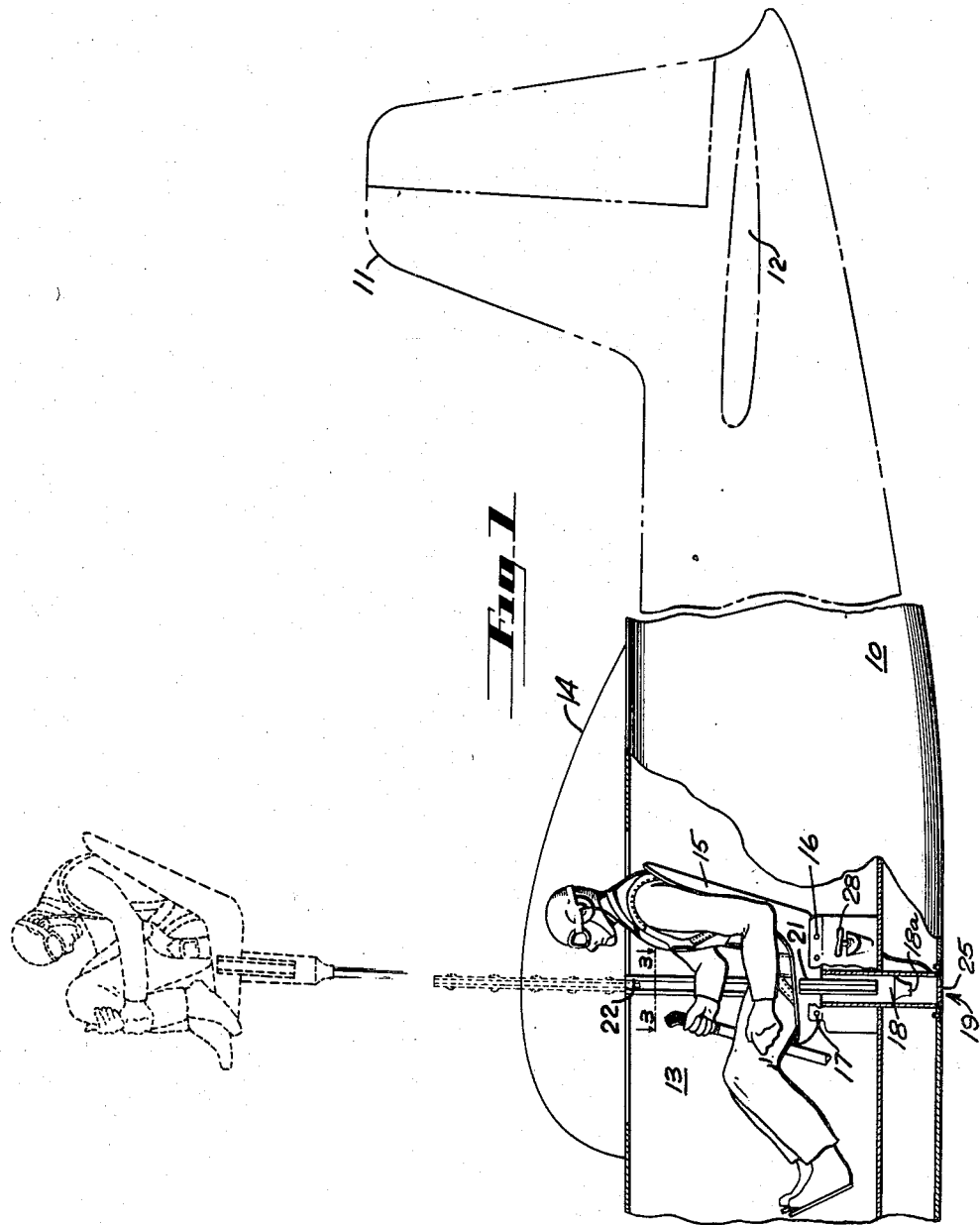
Figure 1 is a fragmentary side elevation of an aircraft embodying the invention, the fuselage being partially broken away to show the invention in inboard profile.
Figure 2:
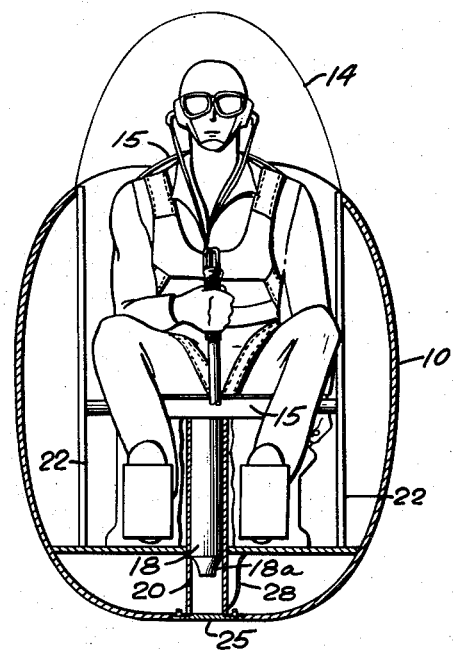
Figure 2 is a view taken at the pilot's cockpit, showing same partly in section and partly in elevation, the seat guides being shown in telescoped condition.
Figure 3:
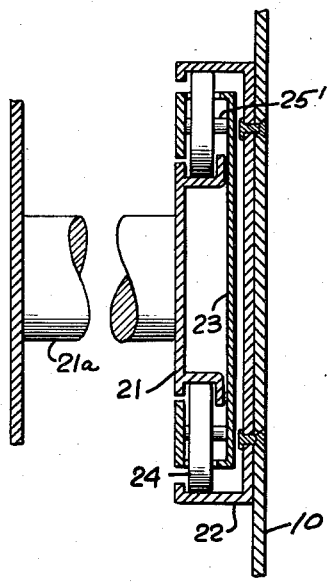
Figure 3 is a section on line 3—3 of Figure 1, sighting in the direction of the arrows.

The invention is illustrated, and hereinafter described, in connection with its embodiment in a single place combat aircraft, and as employed with a bucket type of seat, but it is to be understood that it is by no means limited in the scope of its utility to such exemplificatory forms, and can advantageously be incorporated in other types of aircraft for use with other types of seats, as will become manifest hereinafter.

The construction illustrated comprises a fuselage 10 including an empennage having vertical surfaces 11 and horizontal surfaces 12 constituting the principal obstructions in the path of the pilot when he bails out. The fuselage also includes a cockpit 13 enclosed by a canopy 14, mounted on the fuselage over the cockpit in such a manner as to be easily jettisonable by the pilot in an emergency by means of mounting and actuating mechanism of any suitable conventional type.

In this cockpit there is mounted a releasable seat 15, supported on cross-members 16 and disengageably attached thereto in the conventional manner, as by quickly disconnectable connectors 17, operable by the pilot in a manner hereinafter described.

Figure 4:
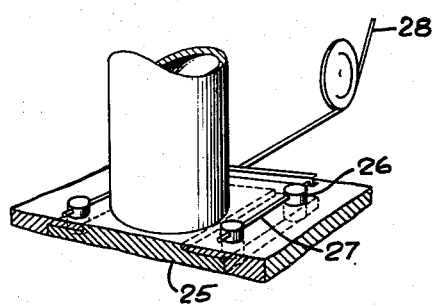
Figure 4 is a fragmentary view of the lower central portion of Figure 2 taken to show the construction of the closure plate removal mechanism.

Attached rigidly and permanently to the center of the lowermost face of the seat, in a vertically disposed attitude, is a jet-reaction motivating means 18, here shown as a propelling rocket of the non-ballistic type, provided with a suitable jet nozzle 18a, as shown. The nozzle is disposed vertically above an aperture 19 in the belly skin of the fuselage. Aperture 19 is normally maintained in a closed condition by a closure member 25 adapted to be held in place by fasteners 26 in turn secured by reciprocable pins 27, removable by means actuatable by the seat occupant, as shown in Figure 4. Preferably, a vertically extending guiding and restraining cylinder 20 for the rocket is suitably disposed concentrically around same and supported from below same on the fuselage or floor frame work.

Means are provided for guiding and steadying the seat as it is urged transversely of the cockpit and outwardly of the airplane. These means may include a suitable short flanged-edge channel member 21 rigidly attached to a shaft 21a extending outwardly from each side of the seat and extending vertically of each side of the seat. A relatively longer and wider, reversely facing channel 22 having inturned edges is disposed vertically at each side of the cockpit in overlapping parallelism with this channel and rigidly attached to the inside of the fuselage in juxtaposition with the seat. Channel 22 preferably extends from the floor to the hatch coaming of the cockpit. Intermediate these two channels is concentrically disposed a free, vertically extending channel 23 having a length equal to that of the channel 22 and a width median of the widths of the channels 21 and 22. On the inner face of channel 23 are mounted rollers 24 by means of axles 25' rigidly carried by the channel 23, the rollers being vertically disposed between the inner side faces of the outer channel and the outer side faces of the inner channel. The roller-mechanism is adapted to facilitate, initially, the vertical movement of the inner channel 21 and the intermediate channel 23 on channel 22, and then the extended movement of channel 21 and the seat on the channel 23 projecting from the upper end of channel 22. Suitable biasing means may, if desired, be interposed between the axles 25' and channel 21, acting to force the channel 23 outwardly against channel 22. Thereby there is maintained a contact between the channel 21, channel 22, and the channel 23 sufficient to cause the sliding movement of channel 21 to be transformed into an upthrust on channel 23 adequate to force same upwardly as an extension of the channel 22, when the seat moves with channel 21. Thus, the seat may travel supportedly on channel 23 after it passes outside the cockpit. However, the biasing means may be, as shown in the drawings, dispensed with if a close fit is employed between all the parts concerned. The inner end of channel 23 bears a stop member, not shown but adapted to engage a corresponding stop on the outer end of channel 22 in order to retain channel 23 in channel 22 in its extended position. Channel 21, of course, bears no such means and is free to slide upwardly out of the upper end of extended channel 23.

A single control member 28, preferably disposed sub-adjacent the pilot's left hand, is suitably connected to the seat unlocking means, the rocket triggering means, and the closure plate pin-removing means. When the occasion arises for ejection-type bailing out, the seat-occupant, after jettisoning the canopy 14, merely energizes control 28, whereupon the three events desired are triggered substantially simultaneously, namely, the seat is disconnected and released from its support, the rocket is ignited, and the rocket-discharge aperture is opened. The seat ejecting reaction is thereupon initiated at a relatively ineffective, low and slow rate, initially insufficient to overcome the initial inertia of the seat, this rate being predeterminable by choice of rocket combustible, nozzle properties, etc. The continuous discharge of the rocket, however, gradually builds up to a discharge volume producing a reaction sufficient to overcome the seat inertia and commences to move the seat rather slowly outwardly. The speed-up or acceleration of this motion can be predetermined at any desired value by pre-selective rocket combustion-rate characteristics, such as to confer gradually increasing speed upon the seat. The rocket being unitary with the seat and firing continuously, the motivating force is not expended in the initial impulse, and instead exerts its thrust-reaction not only while the seat rests free on its support, but throughout the guided travel and free flight-path thereof, and until the pilot leaves the seat. The propelling force is thus applied until the rocket charge is exhausted, and hence can be of a relatively quite small magnitude and of constant amount since its action-distance is much extended.

The seat so propelled, first moves outwardly of the cockpit with the channels 21 and 23 carried by channel 22, until it reaches the level of the top point of channel 22, channel 23 in the meantime being extended out of the cockpit. Thereafter, the seat travels outwardly on the channels 23. The rocket-thrust urges the seat off the end of this channel to project the same at a point lying beyond the path of any craft-borne obstructions. In this latter position, the pilot may unbuckle his safety belt, actuate his parachute rip cord and descend without any danger of contacting any portion of the aircraft or the falling seat.

I claim:
1. In an aircraft: a seat having a guidable member fixed to each side, said seat being movably mounted in a fixed station: guide means for said seat leading outwardly of said aircraft and including a pair of relatively movable normally telescoped portions the inner one of which is directly engaged by the adjacent one of said guidable members on said seat for movement thereby and the outer one of which is attached to the wall of the station; and a gaseous-jet generating reaction power plant operatively associated with the bottom of the seat in an attitude to apply its reaction upwardly thereto and adapted to be actuated by an occupant so as to move said seat outwardly with said seat initially carried in the wall-attached portion of said telescopable guide and thence outside the aircraft carried in the directly-engaged, now extended portion of said guide.

2. In an aircraft including an outwardly movable seat: a gaseous-jet generating reaction power plant for the seat attached to the bottom side thereof with its discharge extending downwardly from said seat; a skin-portion of the aircraft including an aperture for exit of said jet; a closure for said aperture supported removably on said skin; and control means operable by the seat-occupant for concurrently starting the operation of said power plant and removing said closure before discharge of said jet.

3. As a new article of manufacture, an item of aircraft furniture dually constituting a seat and a self-jettisonable, self-propelling aerial conveyance, comprising: an occupant-support member having a bottom and adapted to be mounted upright in the aircraft fuselage so as to enable jettisoning of the same through an opening in the one side of the aircraft occupants' enclosure and into the ambient atmosphere; an elongate gaseous jet-generator attached at the one end to said bottom and projecting downwardly therefrom and having a gaseous discharge nozzle at the lower end thereof, and adapted to generate a jet-action and apply the reaction thereof to said bottom in the direction of movement desired for said seat, said reaction having a low initial impulse-value, a cumulatively increasing impulse value and a relatively moderate maximum impulse value maintainable for an extended period and travel-distance outside the aircraft, thereby to enable the seat to gradually take-off and slowly navigate the ambient atmosphere so as to relieve the occupant of physiological strains incident to ejection; fastening means disposed on said support member, and adapted to releasably engage corresponding fastening means disposed in the fuselage; and control-means for concurrently disengaging said disengageable fastening means and firing said gaseous jet-generator mounted accessibly to the occupant of said support-member.

4. In an aircraft: a fuselage having an empennage and including a cockpit, said cockpit having a closable pilot exit on the one side thereof and a closable opening in the opposite side; an upright tubular member mounted coaxially of said opening; a seat releasably mounted in said cockpit at the upper end of said tubular member; an elongate, tubular reaction jet-generator mounted coaxially of said tubular member with its upper end attached to said seat and its lower end extending into said tubular member and into adjacency with said closable opening, said jet generator containing a charge having a gas producing duration sufficient to enable said seat to take-off from said cockpit and propel itself beyond the aerodynamic envelope of the aircraft and into still air, said jet-generator being so constructed and organized as to generate an action jet having a low initial reaction impulse, a cumulatively increasing reaction and a maximum relatively low reaction; a detent member carried upright by each of the opposite side-faces of said seat; guide means attached upright to each of the sides of said cockpit adjacent each detent member and extensible outside said cockpit to a position beyond the airstream thereby to retain said seat therein against the action of the airstream and prevent its being blown back against the empennage; and a single control means disposed adjacent the seat occupant and operable by him for concurrently opening the closure of said closable opening, releasing said seat, and firing said jet generator; whereby to propel the released seat through the opened pilot exit against dive and pull out forces directed oppositely to the exit path of said seat, and drive it beyond the aircraft generated airstream to transversely traverse the aerodynamic envelope of said empennage and into still air.

5. In an aircraft: a fuselage having an occupant compartment; an occupant exit in one side of said compartment; a blast-discharge exit in another, opposite side of said compartment; an occupant support located in said compartment intermediate said exits; and a continuous gaseous-jet-discharge, expansion-reaction-type prime mover mounted entirely and directly on, and movable with, said support; said prime mover having a continuous gaseous-jet-expansion discharge nozzle for transforming said expansion into an oppositely directed reaction and facing said blast discharge exit to direct its discharge unconstrainedly out through said exit and apply its reaction-force to said support to cause said jet action to impositively move the latter with initially low and accumulatively and gradually increasing, impactless acceleration outwardly through said occupant exit and beyond the envelope of obstructions of the aircraft.

6. In an aircraft: a fuselage having an occupant compartment; an occupant exit in one side of said fuselage; a blast discharge exit in another, opposite side of said fuselage; an occupant support located in said compartment between said exits; guide means carried within said compartment and extending laterally of the longitudinal axis of said fuselage; cooperating means on said support movably engaging said guide means to direct movement of said support out through said occupant exit; and a gaseous-jet-discharge reaction-type prime mover mounted directly on and movable with said support; said prime mover having a discharge nozzle facing said blast discharge exit to force its discharge unconstrainedly out through said exit and apply its reaction force to said support to drive it out through said occupant exit beyond the envelope of the aircraft without impact and with gradual acceleration.

SCHUYLER KLEINHANS.

REFERENCES CITED

The following references are of record in the file of this patent:

UNITED STATES PATENTS

| Number | Name | Date |
|---|---|---|
| 1,337,336 | Townsley | Apr. 20, 1920 |
| 1,874,237 | Bruno | Aug. 30, 1932 |
| 2,168,094 | Cozzitorto | Aug. 1, 1939 |
| 2,335,822 | Bowers | Nov. 30, 1943 |
| 2,467,763 | Martin | Apr. 19, 1949 |

FOREIGN PATENTS

| Number | Country | Date |
|---|---|---|
| 179,936 | Switzerland | Sept. 30, 1935 |
| 444,289 | France | Aug. 3, 1912 |

OTHER REFERENCES

Publication: "Wonder Stories," Fall 1931, cover page.